United States Patent [19]
Zaviska et al.

[11] Patent Number: 6,134,891
[45] Date of Patent: Oct. 24, 2000

[54] METHOD AND DEVICE FOR QUICK POWER REGULATION OF A POWER STATION SYSTEM

[75] Inventors: Oldrich Zaviska, Erlangen; Reinhold Ackenheil, Eckental, both of Germany

[73] Assignee: Siemens Aktiengesellschaft, Munich, Germany

[21] Appl. No.: 09/149,816

[22] Filed: Sep. 8, 1998

Related U.S. Application Data

[63] Continuation of application No. PCT/DE97/00328, Feb. 24, 1997.

[30] Foreign Application Priority Data

Mar. 7, 1996 [DE] Germany ............................ 196 08 873

[51] Int. Cl.⁷ ................................................ F01K 17/00
[52] U.S. Cl. ............................ 60/648; 60/653; 60/677; 60/679
[58] Field of Search ............................. 60/648, 653, 677, 60/679

[56] References Cited

U.S. PATENT DOCUMENTS

| | | | |
|---|---|---|---|
| 3,931,714 | 1/1976 | Jaegtnes et al. | 60/679 X |
| 4,015,430 | 4/1977 | Braytenbah et al. | 60/679 X |
| 4,372,125 | 2/1983 | Dickenson | 60/653 X |
| 5,181,381 | 1/1993 | Gounder | 60/679 X |

FOREIGN PATENT DOCUMENTS

| | | |
|---|---|---|
| 43 02 900 C2 | 10/1944 | Germany . |
| 43 44 118 A1 | 6/1945 | Germany . |
| 33 04 292 C2 | 7/1987 | Germany . |

OTHER PUBLICATIONS

"Contribution possibilities of feed-water-, condensate-, and bleeder steam flow for quick power changes of fossil-fueled power blocks", (Falgenhauer), VGB Power Engineering, vol. 60, No. 1, 1980, pp. 18–23;

*Primary Examiner*—Hoang Nguyen
*Attorney, Agent, or Firm*—Herbert L. Lerner; Laurence A. Greenberg; Werner H. Stemer

[57] ABSTRACT

A quick power regulation for a power station system is achieved by activating energy storage mechanisms of the power station system process. The energy storage mechanisms are used to increase the generator power. At least the generator power and a thermal power extracted from the power station system process are determined as process variables. The process variables characterize the current operating state and determine position setpoint values of actuators. A device for a quick power regulation receives at least values of the generator power and a thermal power extracted from the power system process. The control device determines position setpoint values for a number of actuators connected to a steam turbine of the power station.

11 Claims, 2 Drawing Sheets

6,134,891

METHOD AND DEVICE FOR QUICK POWER REGULATION OF A POWER STATION SYSTEM

CROSS-REFERENCE TO RELATED APPLICATION

This is a continuation of copending International Application No. PCT/DE97/00328, filed on Feb. 24, 1997, which designated the United States.

BACKGROUND OF THE INVENTION

Field of the Invention

The invention relates to a method for a quick power regulation of a power station system. The power station system has a turbo-generator set with a steam turbine and a generator. Energy storage mechanisms, which are present in the system process, are activated. The generator power is increased as a result. The invention further relates to a device carrying out the method for a quick power regulation.

In addition to compensating frequency deviations within a power supply system, it is particularly important to keep a prescribed interchange power at coupling points to subnetworks. These subnetworks make up a distribution network which may be an interconnected network or a separate network. An important requirement is therefore that a quick power increase of a power unit is available within seconds.

The printed publication "VGB Kraftwerkstechnik" (VGB Technology of Power Stations), Issue 1, January 1980, pages 18 to 23 suggests methods for a quick power regulation and a frequency back-up control. While a plurality of intervention possibilities may be carried out simultaneously or alternatively for a quick power regulation in the range of seconds (seconds reserve), a lasting change in the power of a power unit requires a change in the fuel supply. In order to bridge delay times in a fossil-fired power station system, throttled steam turbine governing valves can be opened within seconds. This activates available steam or energy storage mechanisms and utilizes them virtually without delay.

In addition to a power increase by canceling the throttling of governing valves of the steam turbine, preheaters may also be shut down. These preheaters are provided in the water-steam cycle of the steam turbine and are heated with extraction steam from the steam turbine. A condensate flow in the low-pressure heater may be stopped and increased again within a few seconds. The above-described measure for a quick power regulation in fossil-fired power units by shutting down the preheaters with a condensate stop as a further possibility for activating energy storage mechanisms held in reserve is also described, for example, in the German Patent DE 33 04 292 C2.

It is therefore customary to use a regulating device in order to regulate and/or control the so-called quick seconds reserve. The quick seconds reserve refers to a regulated utilization of steam flows to regenerative preheaters and/or heating condensers as well as a utilization of the process steam and of the condensate in the water-steam cycle of the steam turbine of a power station system. For a quick power regulation, that is to say for an activation of the energy storage mechanisms within seconds, the regulating device throttles the steam supply to preheaters, throttles the process steam and/or throttles of the condensate. Desired setting values for regulating valves at turbine extraction points and for actuators setting the condensate are determined such that a required extra generator power is achieved. A disadvantage is that the coordination of the positioning elements or actuators at the turbine extraction points and of the condensate and drains, or secondary condensate regulating system is extraordinarily difficult. Moreover, the priorities of utilizing the individual measures for a quick power regulation are not taken into account. In addition, the control performance has been low since the controlled system is generally nonlinear.

SUMMARY OF THE INVENTION

It is accordingly an object of the invention to provide a method and a device for a quick provision of power in a power station system, which overcomes the above-mentioned disadvantages of the prior art methods and devices of this general type and which achieves a particularly simple and effective regulation.

With the foregoing and other objects in view there is provided, in accordance with the invention, a method for a quick power regulation of a power station system having a turbo-generator set with a steam turbine and a generator, the method which comprises:

obtaining process variables characterizing a current operating state of a power station system and including at least a generator power and a thermal power extracted from a power station system process;

determining position setpoint values in dependence of the process variables for activating energy storage mechanisms of the power station system process and setting an extra generator power.

In addition to the generator power at least one thermal power value, furnished in particular by the steam generator regulation system of the power station system, is used as a further process variable characterizing the current operating state, in order to determine a number of desired setting values. Here, generator power is understood to mean the actual or desired power, desired value or actual value of the extra power, or the maximum possible power of the generator.

The invention determines a combination of measures and thus determines a strategy for activating the energy storage mechanisms while taking account of the current operating state. A multiplicity of process values or process variables of the system process must therefore be evaluated. For this purpose, the discharging and recharging of the available energy storage mechanisms should be regulated in accordance with an assessment of the extra power requirement. A strategy based on technical and economic aspects may be employed for activating the individual energy storage mechanisms.

In order to determine the current operating state of the overall system or of an individual power unit, further process variables are used. Preferably the remote thermal power of the system as well as of an extracted process steam mass flow and/or of the degrees of restriction of actuators of the steam turbine, in particular of a main steam governing valve connected to the steam turbine on the inlet side are used. Moreover, it is further expedient to take account of values or data relating to limitations of the energy storage mechanisms, for example with regard to the load capability of the system. Furthermore, it is expedient to take account, via the technical standby state or activatability of the individual energy storage mechanisms, of data whose content depends on the flow of main steam, extraction steam, exhaust steam and/or condensate in the water-steam cycle of the steam turbine.

In accordance with a further feature of the invention, the process variables further include a degree of restriction of at least one actuator connected to a steam turbine.

In accordance with another feature of the invention, the process variables further include a steam mass flow extracted from the power station system process.

In accordance with yet another feature of the invention, the process variables further include an actual value of the thermal power of the power station system process.

In accordance with a further feature of the invention, the process variables further include information on the activatability of the energy storage mechanisms.

With the foregoing and other objects in view there is also provided, in accordance with the invention, in a power station system having a turbo-generator set with a steam turbine and a generator and having a device for activating energy storage mechanisms present in a power station system process, a device for a quick power regulation of the power station system, comprising:

a regulating device having inputs and outputs, the inputs receiving process variables including at least power values of a generator and a thermal power extracted from a power station system process, the outputs specifying position setpoint values for a plurality of actuators connected to a steam turbine for setting an extra generator power.

In particular, the object of the invention is achieved by means of a regulating device, whose inputs receive the desired power (desired extra power value) and the actual power (actual extra power value) of the generator and at least one thermal power value as a further process variable. The outputs of the regulating device specify desired setting values for actuators connected to the steam turbine—for the purpose of activating the individual energy storage mechanisms. The actuators can be governing valves or dampers for the main steam, as well as the delivery extraction steam or the exhaust steam, pumps for the main condensate or the drains.

In a preferred embodiment, the regulating device comprises a first regulating module, whose inputs contain the desired power and the actual power of the generator and the further process variables or operating values, and whose output specifies component values of a combination of measures for providing a reserve power. The first regulating module also preferably has an input for the degree of restriction of at least one actuator connected to the steam turbine on the inlet side.

Preferably the regulating device further comprises a second regulating module whose input is connected to an output, specifying the combination of measures, of the first regulating module and whose outputs specify desired setting values for steam actuators. A third regulating module, connected on the output side to this regulating module and operating as a correction regulator, expediently contains the power values of the generator as inputs.

The regulating device expediently further comprises a fourth regulating module, whose inputs are respectively connected to an output of the first and of the second regulating module, and whose outputs specify desired setting values for condensate actuators. A fifth regulating module, connected to the first regulating module, of the regulating device serves to correct or match the current degree of restriction of at least one actuator.

In accordance with a further feature of the invention, the regulating device comprises a regulating module, having inputs and an output, the inputs of the regulating module receiving the process variables, and the output specifying component values of a combination of measures for providing a reserve power.

In accordance with another feature of the invention, the regulating module is a first regulating module and the regulating device further comprises a second regulating module having an input connected to the output of the first regulating module and having outputs specifying desired setting values for steam actuators.

In accordance with yet another feature of the invention, the regulating device comprises a third regulating module having inputs for receiving the power values of the generator and having an output connected to the second regulating module.

In accordance with a further feature of the invention, the regulating device comprises a fourth regulating module having inputs connected to at least one output of the second regulating module and to an output of the first regulating module, and having outputs specifying position setpoint values for condensate actuators.

In accordance with another feature of the invention, the regulating module is a first regulating module and the regulating device further comprises a fifth regulating module connected to the first regulating module for correcting a current degree of restriction of at least one of the actuators.

The advantages of the invention are that a particularly favorable solution of the frequently contrary requirements and conditions for activating extra power is made possible by determining a combination of measures for activating energy storage mechanisms in a turbo-generator set while taking account of a number of system-relevant process variables. An optimum overall result is achieved by employing a suitable strategy for activating the energy storage mechanisms. When setting up the strategy, it is possible to take account of limitations which result both from the prescribed provision of the regulating reserve, and from regulations covering a supply of current, process steam and/or heating steam, as well as from technical reasons.

Other features which are considered as characteristic for the invention are set forth in the appended claims.

Although the invention is illustrated and described herein as embodied in method and device for a quick power regulation of a power station system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
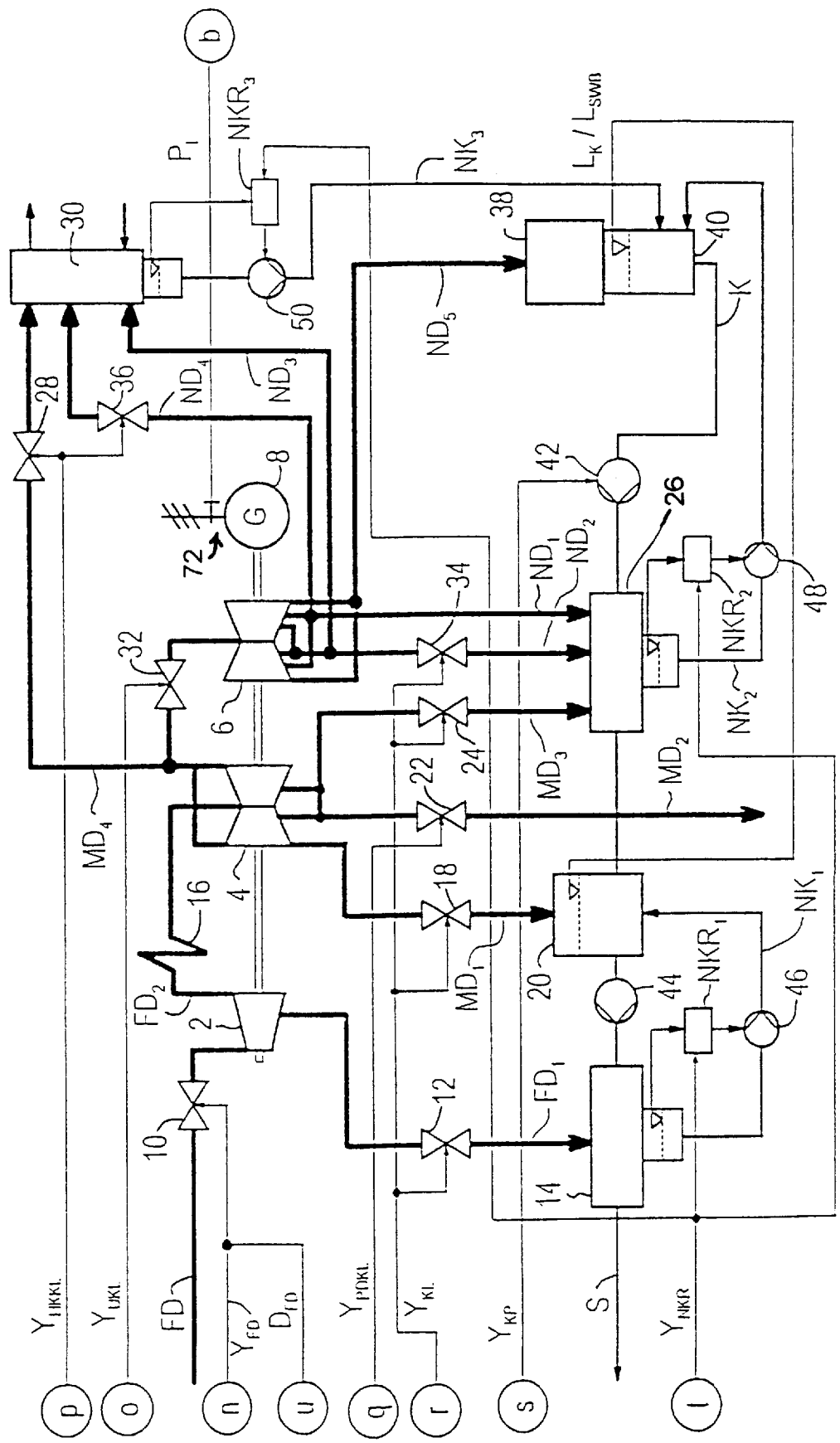
FIG. 1 is a block diagram of a turbo-generator set, the turbo-generator set being a process section of a power unit.

Referring now to the figures of the drawings in detail and first, particularly, to FIG. 1 thereof, there is shown a schematic block diagram of a process section of a power unit having a turbogenerator set. The turbogenerator set includes a high-pressure component turbine 2, an intermediate-pressure component turbine 4 and a low-pressure component turbine 6, as well as a generator 8. During the operation of the turbogenerator set, main steam FD is introduced into the high-pressure component turbine 2 via a main steam governing valve 10. A partial flow $FD_1$ which can be set by a governing valve 12 (damper KL) is extracted from the high-pressure component turbine 2 for a high-pressure preheater train (preheater line) 14. The exhaust steam $FD_2$ from the high-pressure component turbine 2 is fed to the intermediate-pressure component turbine 4 via a reheater 16.

Steam is further extracted from the intermediate-pressure component turbine 4. For this purpose, a governing valve 18 (damper KL) is used to extract an adjustable first partial flow $MD_1$ for a feedwater tank 20. Further, process steam is extracted via a second partial flow $MD_2$, which can be set by a governing valve 22 (process steam damper PDKL). Furthermore, steam is extracted for a low-pressure preheater train 26 via a third partial flow $MD_3$, which can be set by a governing valve 24 (damper KL). A first partial quantity $MD_4$ of the exhaust steam of the intermediate-pressure component turbine 4, which can be set by means of a governing valve 28 (heating condensate damper HKKL), is fed to a heating condenser 30. An adjustable second partial quantity $MD_5$ of the exhaust steam of the intermediate-pressure component turbine 4 is fed to the low-pressure component turbine 6 via a pressure relief damper (overflow damper) 32 (ÜKL).

Steam is also extracted from the low-pressure component turbine 6 for the low-pressure preheater train 26 and for the heating condenser 30. For this purpose, a first partial flow $ND_1$ is fed directly, and a second partial flow $ND_2$ is fed via a governing valve 34 (damper KL) to the low-pressure preheater train 26. Likewise, the heating condenser 30 is fed a third partial flow $ND_3$ directly and a fourth partial flow $ND_4$, via a governing valve 36 (heating condensate damper HKKL). The exhaust steam $ND_5$ from the low-pressure component turbine 6 condenses in a condenser 38.

A condensate pump 42 conveys the main condensate K from the hotwell 40 of the condenser 38 via the low-pressure preheater train 26 into the feedwater tank 20. A feedwater pump 44 delivers feedwater S from the feedwater tank 20 via the high-pressure preheater train 14. A drains pump 46 conveys drains (secondary condensate) $NK_1$ from the high-pressure preheater train 14 into the feedwater tank 20. Likewise, a drains pump 48 conveys drains $NK_2$ from the low-pressure preheater train 26 into the condenser 38, that is to say into the hotwell 40 thereof. Moreover, a drains pump 50 conveys drains $NK_3$ from the heating condenser 30 into the hotwell 40 of the condenser 38.

The conveyance of the main condensate K and of the feedwater S is performed via a liquid-level control system $L_K/L_{SWB}$. The conveyance of the drains $NK_{1,2,3}$ is set via separate liquid-level control systems $NKR_1$, $NKR_2$ and $NKR_3$ respectively. The latter are supplied with a common desired setting value $Y_{NKR}$.

Figure 2:
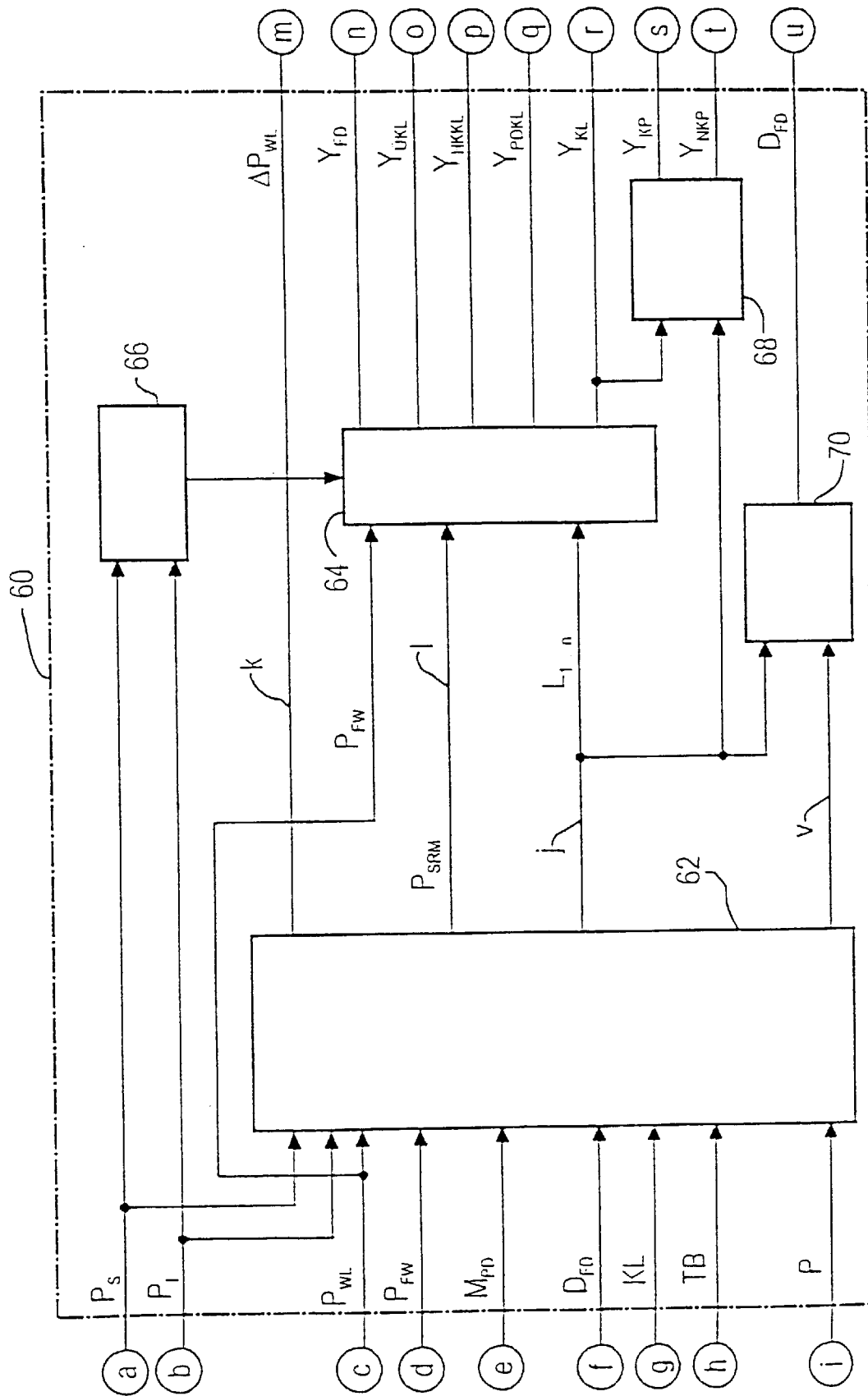
FIG. 2 is a block diagram of a regulating device for the process section in accordance with FIG. 1.

FIG. 2 illustrates the device a for quick power regulation. The device comprises a regulating device 60 having five regulating modules 62, 64, 66, 68, and 70. As input variables a and b, the regulating device 60 receives a power requirement $P_S$ and an actual value $P_I$ of the power or the extra power. The actual value $P_I$ of the extra power is measured by means of a measuring device 72 on the generator 8 (FIG. 1). As a further input variable c, the regulating device 60 receives a desired value of the thermal power $P_{WL}$, which is ascertained (in a way not represented in more detail) from the steam generator regulating system of the power unit. Furthermore, the regulating device 60 receives items of information on the operating state of the power unit as input variables d to h. These are, as input variable d, remote heat power $P_{FW}$, as input variable e, the extracted quantity of process steam or the process steam mass flow $M_{PD}$, as input variable f, the degree of restriction (throttling) $D_{FD}$ of the main steam governing valve 10, as input variable g, the load capability KL of the power unit and, as input variable h, the technical standby state TB of available energy storage mechanisms. Further operating values P can be fed to the regulating device 60 via the input i.

The inputs a to i belong to the first regulating module 62 of the regulating device 60. These inputs take account of the process variables $P_S$, $P_I$, $P_{WL}$, $P_{FW}$, $M_{PD}$, $D_{FD}$, KL, TB and P, which are used for the process section to be regulated. Decision criteria for a combination of measures are drawn up or generated in the first regulating module 62 with the aid of an algorithm. The algorithm is based on knowledge concerning the process technology relating to the reserve power potential of the individual measures. For this purpose, the current operating state is determined, which is characterized by the generator power $P_S$ and the remote heat power $P_{FW}$ as well as by the process steam mass flow $M_{PD}$ and the degree of restriction (throttling) $D_{FD}$. An optimum combination of measures $L_{1...n}$ for covering an instantaneously required reserve power is determined for each current operating state. When determining an optimum combination, account is also taken of the limitations due to the load capability KL and the technical standby state TB of the individual measures $L_n$. Subsequently, the power components $P_{SRM(1...n)}$ are calculated for the determined measures $L_n$, and a release signal for the measures $L_n$ involved is formed as output variable l. Furthermore, an additional thermal power $\Delta P_{WL}$, for the steam generator regulating system (not illustrated) is determined as a further output variable k.

The output variables j and l, as well as the remote thermal power $P_{FW}$, are the input variables of the regulating module 64. The regulating module 64 generates as output variables n to r the desired setting values (position setpoint values) $Y_{FD}$, $Y_{Ü}KL$, $Y_{HKKL}$, $Y_{PDKL}$ and $Y_{KL}$ for the main steam governing valve 10, the pressure relief damper 32, the governing valves 28 and 36, the governing valve 22 and the governing valves 12, 18, 24 and 34, respectively. The regulating module 66 is connected to the regulating module 64 and receives as input variables the desired power value $P_S$ and the actual value of the extra power $P_I$ for correcting the calculated desired setting values (position setpoint values) Y.

The regulating module 68 determines the corrections for the desired setting values (position setpoint values) $Y_{KP}$, $Y_{NKP}$ of the condensate and drains regulating system $NKR_{1,2,3}$ depending on the measure $L_n$, the setting of the dampers or governing valves 10, 12, 18, 22, 24, 28, 30, 32, 34 and/or 36 as well as the rates of change of the positions thereof. The regulating device 68 outputs these corrections as output variables s and t. For this purpose, the regulating module 68 receives as input variables the output variables j and r of the regulating module 62 and 64, respectively, that is to say the desired setting value $Y_{KL}$, and the combination of measures $L_{1...n}$.

The regulating module 70 contains algorithms for determining the required degree of restriction (throttling) for the main steam governing valve 10. For this purpose, the regulating module 70 receives from the regulating module 62, as input variables, the output variable j and a further output variable v, which describes the current operating state of the power unit. The calculated degree of restriction of the main steam governing valve 10 is compared with a preselected degree of restriction, and an automatically matched degree of restriction $D_{FD}$ is output as output variable u.

The throttling of the main steam governing valve or main steam actuator 10 setting the main steam mass flow conveyed to the high-pressure component turbine 2, thus builds up an energy storage mechanism. This storage mechanism can be activated in a regulated fashion and, via the determined desired setting value (position setpoint value) $Y_{FD}$ and via the degree of restriction $D_{FD}$, can be charged in a controlled fashion or discharged in a controlled fashion in order to provide a reserve power. In order to activate the additional energy storage mechanisms it is possible to throttle the partial flows of extraction steam and exhaust steam $FD_{1,2}$, $MD_{1...5}$, $ND_{1...5}$ as well as the conveyance of the condensate K and of the drains NK individually or together as well as partially or completely by means of the corresponding actuators (governing valves, pumps) 12, 18, 22, 24, 28, 32, 34, 36, 42, 46, 48, 50. The feeding of the preheater trains 14, 26 is thereby temporarily reduced or stopped. The regulating device 60 also controls this operation with the aid of the appropriate desired setting values (position setpoint values) Y.

The combination of the knowledge of process engineering with contractual provisions, which can have a particular influence on the selection of the measures $L_n$, especially in the case of supplying process steam and heating steam, is fundamental to the regulating device 60. It ensures that the existing energy storage mechanisms are used economically and that the power station system is operated carefully and with consideration.

We claim:

1. A method for a quick power regulation of a power station system having a turbo-generator set with a steam turbine and a generator, the method which comprises:

obtaining process variables characterizing a current operating state of a power station system and including at least a generator power and a thermal power extracted from a power station system process;

determining position setpoint values in dependence of the process variables for activating energy storage mechanisms of the power station system process and setting an extra generator power.

2. The method as claimed in claim 1, wherein the process variables further include a degree of restriction of at least one actuator connected to a steam turbine.

3. The method as claimed in claim 1, wherein the process variables further include a steam mass flow extracted from the power station system process.

4. The method as claimed in claim 1, wherein the process variables further include an actual value of the thermal power of the power station system process.

5. The method as claimed in claim 1, wherein the process variables further include information on the activatability of the energy storage mechanisms.

6. In a power station system having a turbo-generator set with a steam turbine and a generator and having a device for activating energy storage mechanisms present in a power station system process, a device for a quick power regulation of the power station system, comprising:

a regulating device having inputs and outputs, said inputs receiving process variables including at least power values of a generator and a thermal power extracted from a power station system process, said outputs specifying position setpoint values for a plurality of actuators connected to a steam turbine for setting an extra generator power.

7. The device according to claim 6, wherein said regulating device comprises a regulating module, having inputs and an output, said inputs of said regulating module receiving the process variables, and said output specifying component values of a combination of measures for providing a reserve power.

8. The device according to claim 7, wherein said regulating module is a first regulating module and said regulating device further comprises a second regulating module having an input connected to said output of said first regulating module and having outputs specifying desired setting values for steam actuators.

9. The device according to claim 8, wherein said regulating device comprises a third regulating module having inputs for receiving the power values of the generator and having an output connected to said second regulating module.

10. The device according to claim 8, wherein said regulating device comprises a fourth regulating module having inputs connected to at least one output of said second regulating module and to an output of said first regulating module, and having outputs specifying position setpoint values for condensate actuators.

11. The device according to claim 7, wherein said regulating module is a first regulating module and said regulating device further comprises a fifth regulating module connected to said first regulating module for correcting a current degree of restriction of at least one of said actuators.

* * * * *